Sept. 15, 1970  F. E. NORLIN ET AL  3,528,756

PRESSURE LOADED PUMP

Filed Dec. 4, 1968  2 Sheets-Sheet 1

INVENTORS
FRANCIS E. NORLIN
MICHAEL A. KERESMAN, JR.

BY *Robert V. Jambor*
ATTORNEY

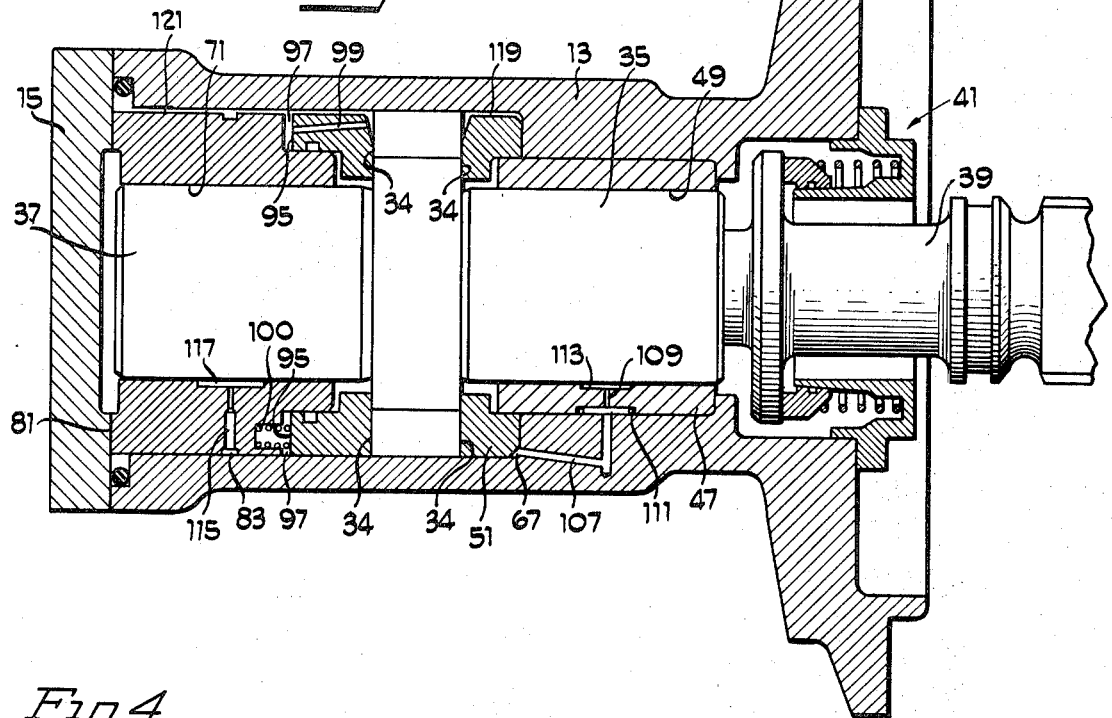
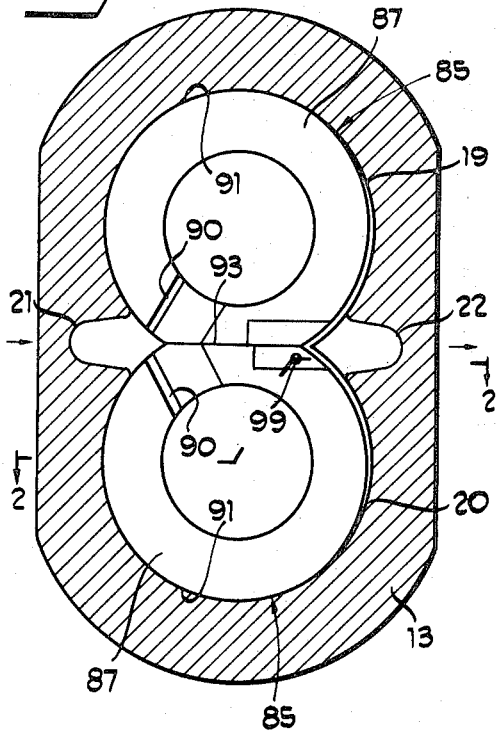
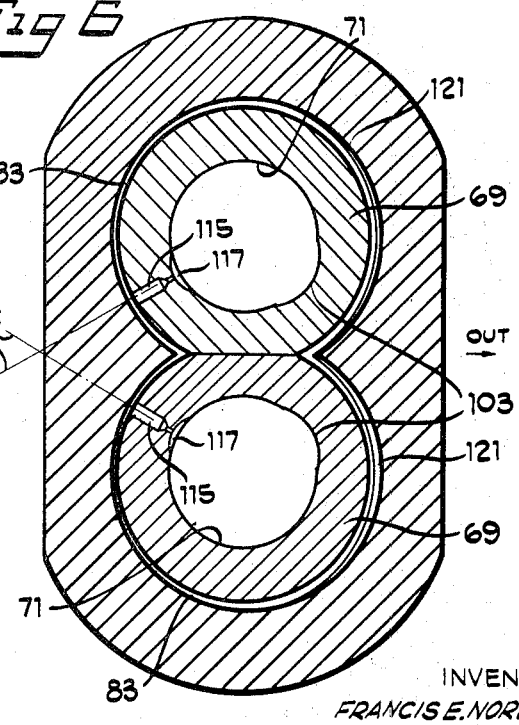

United States Patent Office 3,528,756
Patented Sept. 15, 1970

3,528,756
PRESSURE LOADED PUMP
Francis E. Norlin, Chesterland, and Michael A. Keresman, Jr., Seven Hills, Ohio, assignors to Borg-Warner Corporation, Chicago, Ill., a corporation of Delaware
Filed Dec. 4, 1968, Ser. No. 780,954
Int. Cl. F04c 1/08, 5/00, 15/00
U.S. Cl. 418—73
7 Claims

ABSTRACT OF THE DISCLOSURE

A pressure loaded gear pump having separately formed journal bearings and pressure loaded pumping seals including a hybrid arrangement for lubrication of the journal bearing bores. The pump includes means for providing both hydrodynamic and hydrostatic lubrication of the pumping gear journal bearings.

BACKGROUND OF THE INVENTION

This invention relates to pressure loaded gear pumps. More particularly it relates to pressure loaded gear pumps having separately formed journal bearings and pressure loaded pumping seals.

Certain forms of pressure loaded gear pumps include integrally formed elements disposed on opposite sides of the pumping gears which define both the journal bearings which support the gears and also the pressure loaded pumping seals which seal against the gear side faces to provide efficient pump operation. One element associated with each gear is axially movable to provide the necessary pressure loading.

Pumps of more advanced design include separately formed bearing and pumping seal elements which accommodate misalignment between the gear journals and gear side faces. In such designs a stationary sleeve is fixed in the pump housing to define each journal bearing. A separate pumping seal is disposed in surrounding relation to each sleeve which includes a planar surface which seals against the gear side face. One pumping seal associated with each gear is axially movable and pressure loaded against the pumping gear to establish an effective seal between the pumping seal planar surfaces and the gear side faces.

One problem encountered in the development of pressure loaded gear pumps having separate bearings and pumping seals is that of providing adequate lubrication for the pumping gear journals. The fluid pressure gradient existing about the pumping gears creates a zone of load concentration on each journal bearing displaced toward the inlet side of the pump. This factor and operating conditions such as high operating temperatures, low fluid viscosity, or poor lubricity render conventional lubricating arrangements inadequate for all pump applications.

Lubrication of the journal bearings is normally provided by a hydrodynamic film of pumped fluid directed between the journals and the bearing bores. Typically, fluid enters from the discharge side of the pump and establishes a lubricating film extending about the journal. Alternatively fluid passes from the pump cavity across the journal bearing bores to the pump inlet. In either event it has been found that in many cases, and particularly under adverse operating conditions such as those previously described, the hydrodynamic film is inadequate to protect the bearing bores from excessive wear at the load concentration zones. As a result, premature bearing failures occur.

Accordingly, it is the principal object of the present invention to provide a pressure loaded pump having separately formed journal bearings and pressure loaded pumping seals which includes an improved arrangement for lubrication of the journal bearings, particularly at the area of load concentration of the bearing bores.

It is another important object of the present invention to provide an improved form of pressure loaded pump having separately formed journal bearings and pressure loaded pumping seals which includes a hybrid lubrication arrangement providing both hydrodynamic and hydrostatic lubrication of the bearings and journals.

SUMMARY OF THE INVENTION

The present invention is directed to the provision of combined hydrodynamic and hydrostatic lubrication of the journal bearings of a pressure loaded pump having separately formed journal bearings and pressure loaded pumping seals.

The journal bearing bores are provided with passages communicating with a source of pumped fluid which is directed between the gear journals and the bearing bores to provide a hydrodynamic lubricating film. Clearances between pump components and formed passages in the pump housing and journal bearings cooperate to define a path of communication between pumped fluid at discharge pressure and the zones of load concentration of the journal bearing bores to provide hydrostatic lubrication of the journals at these critically loaded areas.

DESCRIPTION OF THE DRAWINGS

Particular objects and advantages of the present invention will become readily apparent with reference to the following description and the accompanying drawings.

FIG. 2 is a revolved sectional plan view of the apparatus of FIG. 1 taken generally along the line 2—2 of FIG. 1 and along the lines of 2—2 of FIGS. 4 and 5.

FIG. 4 is a sectional view of the apparatus of FIG. 1 taken generally along the line 4—4 of FIG. 1.

FIG. 6 is a sectional view of the apparatus of FIG. 1 taken generally along the line 6—6 of FIG. 1.

DETAILED DESCRIPTION

Figure 1:
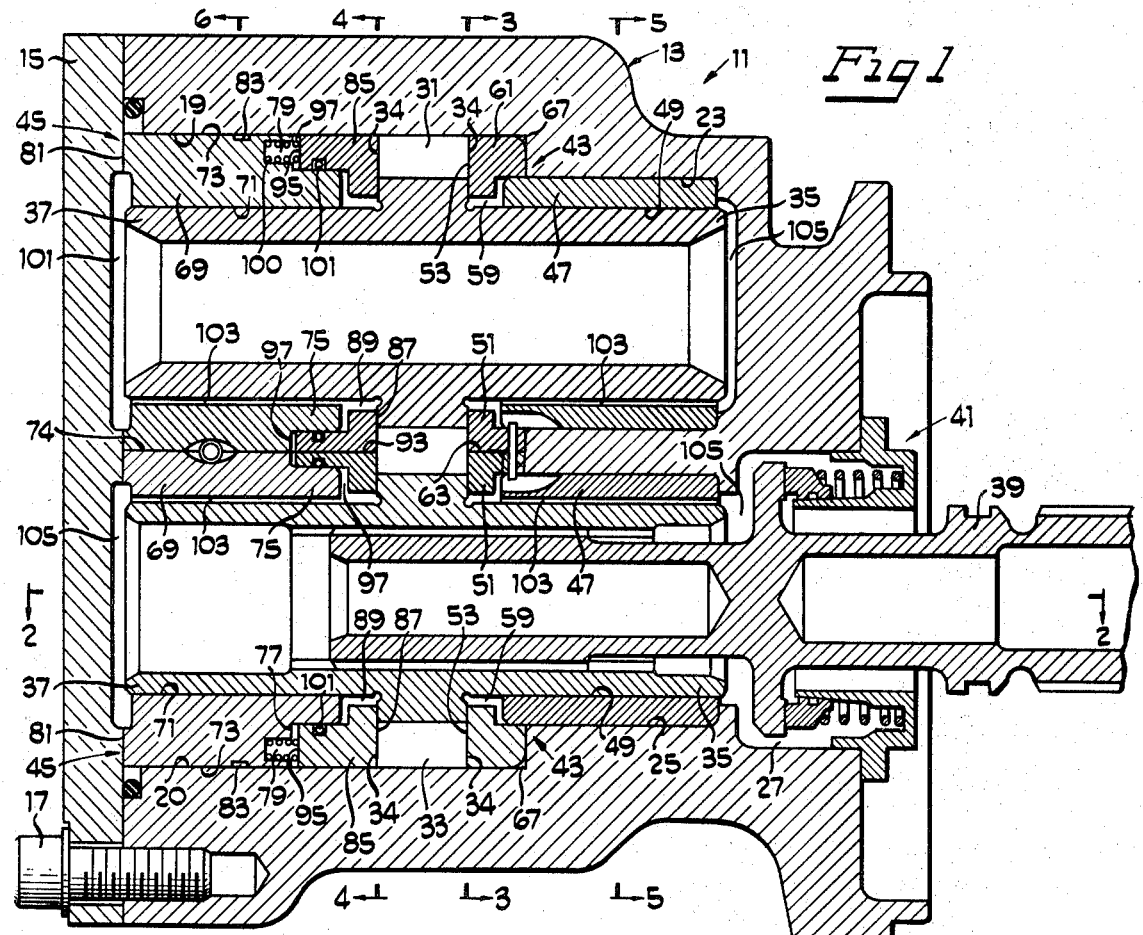
FIG. 1 is a sectional elevational view of a pressure loaded pump having separately formed journal bearings and pressure loaded pumping seals which is illustrative of the principles of the present invention.

Turning now to the drawings there is shown an embodiment of a pressure loaded pump illustrative of the principles of the present invention.

The pump, generally designated 11, includes a main body portion 13 and a closure member 15. These sections are bolted together as at 17 to define a pump cavity having a pair of parallel bores or pumping gear chambers 19 and 20. Appropriate inlet and discharge ports 21 and 22, best seen in FIG. 4, are provided in the body portion 13 which communicate with the pumping gear chambers.

The pump cavity defined by the body portion 13 further includes a pair of reduced diameter bearing receiving bores 23 and 25 each one of which is coaxial with, and disposed adjacent, one end of one of the pumping gear chamber bores. An opening 27 extends through the body portion 13 into communication with the bearing receiving bore 25.

A pair of intermeshing pumping gears 31 and 33 are disposed with the pump cavity within the pumping gear chambers 19 and 20. The gears include parallel side faces 34 extending perpendicularly of the axis of rotation of the gears.

The gears further include integrally formed hollow journals 35 and 37 extending axially outwardly from the gear side faces 34 which rotatably support the gears within the pump. One gear 33 includes an internal spline formed within the journals to receive a drive shaft 39. A seal 41 is disposed in the opening 27 which provides a fluid tight seal between the shaft 39 and the main body portion 13. Rotation of the drive shaft by an external power source (not shown) causes rotation of the intermeshed gears and consequent pumping of fluid between the inlet and discharge ports.

The pumping gears 31 and 33 are operatively supported within the pump 11 by bearing and pumping seal assemblies 43 and 45 disposed on opposite sides of each pumping gear in surrounding relation to the journals 35 and 37.

The bearing and pumping seal assemblies 43 and 45 associated with one of the gears 31 and 33 are essentially identical to the assemblies associated with the other. Therefore only the assembly 43 and the assembly 45 associated with the gear 33 will be described in detail, it being understood that the description is equally applicable to the assemblies 43 and 45 associated with the gear 31.

Referring to FIGS. 1 and 2 the bearing and pumping seal assembly 43 associated with the pumping gear 33 includes an annular journal bearing 47 pressed into the bearing receiving bore 25. The journal bearing 47 defines a cylindrical bearing surface 49 which rotatably supports the journal 35 of the pumping gear.

The bearing and pumping seal assembly 43 further includes an annular pumping seal 51 associated with the journal bearing 47 and disposed in surrounding relation to the journal 35. The pumping seal includes an essentially planar sealing face 53, best seen in FIG. 3, disposed in sealing contact with the associated pumping gear side face 34.

The pumping seal 51 includes an inner cylindrical surface surrounding the journal 35 which defines with the journal, an annular passage 59. The planar sealing face 53 of the pumping seal 51 includes a groove 60 communicating with the passage 59 to approximately the point of separation of the rotating intermeshed gears.

The pumping seal 51 also includes an outer peripheral surface 61 which is shaped to conform with the pumping chamber defining bore 20 and which fits within the bore with only a minimal clearance necessary to allow assembly of the pump. The pumping seal 51 is essentially stationary and abuts the step formed in the main body 13 between the bore 20 and the bearing receiving bore 25.

The outer peripheral surface 61 of the pumping seal also includes a flat portion 63. The flat portions of the pumping seals are disposed in face-to-face contact and prevent rotation during operation (see FIG. 3).

The outer peripheral surface 61 of the pumping seal 51 is further provided with a chamfered surface which defines with the pump main body portion 13 a passage 67.

Turning now to the bearing and pumping seal assembly 47 associated with the journal 37, that assembly includes a journal bearing 69 having an inner cylindrical or bearing surface 71 which rotatably supports the journal 37. The journal bearing 69 is disposed within the parallel bore 20 and includes an outer peripheral surface 73 which is generally cylindrical and sized to allow insertion of the journal bearing into the bore. The outer peripheral surface of the journal bearing includes a flat portion 74 disposed in mating contact with the corresponding journal bearing 69 in the bore 19 to prevent rotation of the journal bearings.

An end of the journal bearing 69 adjacent the pumping gear 33 includes a stepped portion 75 which defines a radially directed surface 77. A plurality of axially directed pockets 79 are formed about the surface 77.

An opposite end of the journal bearing 69 includes a radial surface 81 disposed in contact with the closure member 15 to prevent movement of the journal bearings in a direction away from the pumping gears 31 and 33.

Intermediate the stepped portion 75 and the radial surface 81 the journal bearing 69 is provided with a groove which defines a passage 83 extending about the outer peripheral surface 73.

The bearing and pumping seal assembly 47 further includes a pressure loaded pumping seal 85 associated with the journal bearing 69 and disposed in surrounding relation to one of the journals 37. The pumping seal includes an essentially planar sealing face 87, best seen in FIG. 4, in sealing contact with the associated pumping gear side faces 34.

The pumping seal 85 includes an inner cylindrical surface surrounding the journal 37 which defines with the journal an annular passage 89. As seen in FIG. 4, the planar sealing face 87 includes a groove 90 communicating with the passage 89, and extending radially to approximately the point of separation of the rotating intermeshed gears.

The pumping seal 85 further includes an outer peripheral surface 91 which is essentially cylindrical, conforming to the shape of the bore 20 and sized to allow axial movement within the bore. The outer peripheral surface 91 further includes a flat portion 93. The pumping seals 85 are disposed in the bores 19 or 20 with the surfaces 93 in face-to-face contact to prevent rotation of the pumping seals as shown in FIG. 4. They are however free to move axially with respect to the journal bearings 69.

The pumping seal 85 includes an axially extending portion overlying the stepped portion 75 of the journal bearing 69 which includes a radially directed motive surface 95 facing, and spaced from the radial surface 77. These two surfaces define a pressure loading chamber 97.

A single passage 99 is formed in one of the pumping seals 85, as is best seen in FIGS. 2 and 4, which connects the pressure loading chambers 97 with a source of pumped fluid at essentially discharge or outlet pressure. During pump operation pressurized fluid exerts an axial force upon the pumping seals 85 urging them in a direction toward the pumping gears 31 and 33. The pressurized fluid acting against the motive surfaces 95 urges the planar sealing faces 87 to seal against the parallel side faces 34 of the gears and urges the gears toward the pumping seals 51. This action, in turn, causes the planar sealing faces 53 to engage the parallel side faces of the gears 31 and 33. In this manner an efficient, well sealed pumping chamber is provided to minimize pumping losses. Springs 100 disposed in pockets 79 provide initial loading of the pumping seals against the gear side faces.

An O ring seal 101 is provided between the stepped portion 75 of the journal bearings 69 and the axially extending portion of the pumping seals 85 to prevent leakage of the pressurized fluid from the pressure loading chambers 97.

Lubrication of the journal bearing bore surfaces 49 and 71 is accomplished by a hybrid arrangement which directs pumped fluid between the bearing surfaces and journals to provide both hydrodynamic and hydrostatic lift. The hydrodynamic lift is provided by pumped fluid which during pump operation is directed between the bearing bores and journals and develops a hydrodynamic film extending about the bearing surfaces.

The pressure gradient which exists between the pump discharge and pump inlet creates excessive forces on the pumping gears 31 and 33 and associated journals 35 and 37 which cause the pump components to shift radially within the housing 13 toward the inlet side of the pump. These forces create an area of load concentration between the journals 35 and 37 and bearing bore surfaces 49 and 71 located along the imaginary lines designated C in FIGS. 5 and 6. To compensate for the increased loading of the journals against the journal bearings, pumped fluid at an essentially discharge pressure is directed to the bearings at these load zones. The pumped fluid provides hydrostatic lift and counteracts the force acting upon the journals. In this way, adequate lubrication of the journals and bearings is insured even under the most adverse operating conditions.

In the illustrated embodiment, the hydrodynamic film which provides lubricant separation between the journals 35 and 37 of the bearing surfaces 49 and 71 is established utilizing low pressure fluid. Each of the journal bearing surfaces 49 and 71 is provided with a groove or relief 103 extending longitudinally of the bearings (see FIGS. 5 and 6). These grooves communicate with portions of the pump cavity designated 105 which are spaced axially outwardly of the journal bearings and with annular passages 59 and 89. The areas designated 105 are in communication with the fluid entering the pump inlet through passages (not shown) in the pump main body portion 13.

The grooves 60 and 90 in the planar sealing faces of the pumping seals 51 and 85, in turn, communicate the annular passages 59 and 89 with the inlet side of the pump at the point of separation of the intermeshed rotating gears. As the intermeshed gear teeth move apart, they momentarily define a chamber of expanding volume. This creates a vacuum or reduction in pressure which causes pumped fluid to flow from the inlet of the pump through the portions 105 of the pump cavity, through the grooves 103 in the journal bearings and through the annular passages 59 and 89 and grooves 60 and 90 to the inlet side of the pump at the point of separation of the gear teeth. Relative rotation between the journals 35 and 37 and the bearing bore surfaces 49 and 71 draws the lubricant film between the surfaces to provide hydrodynamic lift.

While low pressure fluid passing across the journal bearings toward the pumping gears is utilized to provide hydrodynamic lubrication in the embodiment illustrated any known arrangement of hydrodynamic lubrication may be utilized. For example, the grooves 60 and 90 in the planar sealing surfaces of the pumping seals 51 and 85 may alternatively be directed into communication with the pump discharge. High pressure fluid will then pass into the annular passages 59 and 89 and into the grooves 103 to provide hydrodynamic lubrication.

Hydrostatic lubrication of the zones of load concentration of the journal bearings is provided by directing high pressure pumped fluid to the critical areas to counteract the forces urging the journals toward the bearing bore surfaces at these points.

Referring particularly to FIG. 2, the main body portion 13 of the pump 11 includes a pair of passages 107 which communicate with the passages 67 formed by the chamfers extending about the pumping seals 51. The passages 107 are open at the bearing receiving bores 23 and 25, approximately midway between the ends of the journal bearings. The journal bearings 47 include passages 109 which are open at the outer peripheral surfaces of the bearings in alignment with the passages 107 of the main body portion 13. An O ring seal 111 is disposed between each journal bearing and the bearing receiving bores 23 and 25 to prevent leakage and loss of effectiveness of the hydrostatic lubrication.

Figures 3, 5:
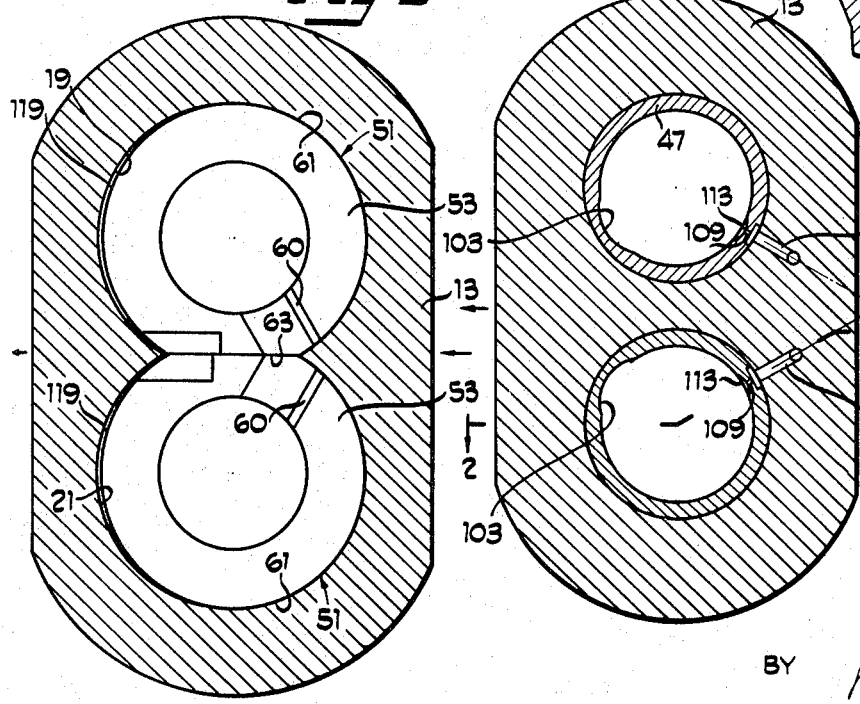
FIG. 3 is a sectional view of the apparatus of FIG. 1 taken generally along the line 3—3 of FIG. 1.
FIG. 5 is a sectional view of the apparatus of FIG. 1 taken generally along the line 5—5 of FIG. 1.

The passages 109 extend toward the journal bearing bore surfaces 49 and terminate in an axially extending groove 113 formed at the point of load concentration (see FIG. 5). These latter grooves provide means for distribution of the high pressure pumped fluid between the journal and journal bearing bore surfaces.

As previously pointed out, the pressure gradient between the discharge and inlet areas of the pump cause the pump components to shift transversely toward the pump inlet along the lines of action designated C in FIGS. 5 and 6. This is true not only of the pumping gears 31 and 33 associated journals 35 and 37 and bearings 47 and 69 but is equally applicable to the pumping seals 51. High pressure pumped fluid enters the clearance between the pumping gear chamber bores 19 and 20 and the cylindrical outer peripheral surfaces 61 causing the pumping seals to shift toward the inlet side of the pump. The clearance between the outer peripheral surfaces 61 of the pumping seals and the portions 19 and 20 thereby define a clearance passage 119, best seen in FIGS. 2 and 3 which communicate with the discharge side of the pump and with the passages 67.

It should be noted that the clearance passages 119 are greatly magnified in the accompanying drawings for purposes of illustration.

High pressure fluid passes through the clearance passages 119 and into the grooves 67. The pressurized fluid then travels about the outer periphery of the pumping seals into communication with the passages 107. The fluid then passes through the passages 107 into the passages 109 in the journal bearings 47 and into the axially extending grooves 113. The zones of load concentration are thereby subjected to pumped fluid at discharge pressure. The fluid acts between the journal bearing bores 40 and the journals 35 to counteract the force urging the journals against the bearing surfaces at the load zones.

Turning now to the journal bearings 69, each is provided with passages 115 which is open to the passages 83 which extend about the outer peripheral surfaces 73 of the bearings. The passages 115, best seen in FIG. 6, communicate with axially extending grooves 117 similar to the grooves 113 of the journal bearings 47. These passages are formed at the zones of load concentration between the journals 37 and the bearing bore surfaces 71.

Transverse shifting of the pump components toward the inlet side of the pump results in an expansion of the clearance between the outer peripheral surfaces 73 of the journal bearing 69 of the bores 19 and 20 of the pump housing main body portion to define clearance passages 121 shown in FIG. 2. These clearance passages are greatly magnified in the drawings for purposes of clarity.

The passages 121 communicate between the grooves 83 of the journal bearings and the pressure loading chambers 97 which, in turn, communicate with pump discharge pressure through the passages 99. Pressurized fluid passes from the pressure loading chambers 97 to the grooves 83 to the clearance passages 121. The pressurized fluid travels about the outer peripheral surfaces of the bearings through the grooves 83 to the inlet side of the pump and into passages 115. The fluid then enters the grooves 117 formed at the point of load concentration of the bore surfaces 71. The pressurized fluid acts between the journals 37 and the journal bearing bore surfaces to counteract the force urging the journals toward the zones of load concentration.

With the above arrangement, efficient hydrodynamic and hydrostatic lubrication of the journal bearings is assured, even under adverse operating conditions.

In the illustrated embodiment the hydrostatic lubrication of the journal bearing bores is provided by axially extending grooves 113 and 117. It must be appreciated, however, that any desired pattern may be formed at the zones of load concentration for distribution of the high pressure lubricant. For example, the passages 109 and 115 may be sized to allow sufficient exposure of the journals 35 and 37 to pressurized fluid at the zones of load concentration that grooves such as the grooves 113 and 117 may be completely eliminated. In the alternative, axially extending grooves such as the grooves 113 and 115 may be supplemented by circumferential grooves communicating with the axial grooves to form a fluid distribution pattern at the load zones.

In the embodiment illustrated, the passages 109 and 115 are sized to define flow limiting orifices to prevent excess leakage from the zones of high pressure to the journal bearing bores. In this way, loss of efficiency of the pump is prevented.

Various features of the invention have been particularly shown and described, however, it must be appreciated that various modifications may be made without departing from the scope of the invention. In particular, the principles of the present invention have been illustrated in connection with an embodiment taking the form of a hydraulic pump. However, it is obvious that the apparatus may be reversed and utilized as a hydraulic motor without in any way departing from the spirit and scope of the invention.

What is claimed is:

1. A pressure loaded pump comprising: a housing defining a pump cavity having an inlet and a discharge, a pair of intermeshed pumping gears disposed within said cavity adapted to pump fluid from said inlet to said discharge, each said gear including a pair of parallel side faces and a pair of journals extending axially outwardly of said side faces, a pair of bearing and pumping seal assemblies associated with each said gear, each said assembly including a journal bearing supported by said housing and including a journal bearing bore surface rotatably supporting one of said journals, each said assembly further including a separately formed pumping seal surrounding said journal including a generally annular, planar sealing face, the pumping seal of one of said assemblies associated with each said gear being essentially stationary and the pumping seal of the other of said assemblies being axially movable and defining with said housing and journal bearing a pressure loading chamber adapted to receive pumped fluid at essentially discharge pressure to urge said movable pumping seal toward said stationary pumping seal causing said planar sealing faces of said pumping seals to contact said gear side faces, and a hybrid lubrication means providing hydrodynamic and hydrostatic lubrication of said journal bearings comprising; means communicating pumped fluid to said journal bearings intermediate said bearing bore surfaces and said journals to develop a hydrodynamic film therebetween during rotation of said journals within said bearing bore surfaces; and means communicating pumped fluid at essentially discharge pressure to said journal bearings at the zones of concentration of load of said journals and bearing bore surfaces to provide hydrostatic lubrication therebetween.

2. A pressure loaded pump as claimed in claim 1 wherein said means providing said hydrostatic lubrication of said journal bearings includes means defining a passage in each said journal bearing open at said zones of load concentration of said bearing bore surfaces and said journals, said hydrostatic lubrication providing means further including means providing communication between said passages in said journal bearings and said discharge of said pump.

3. A pressure loaded pump as claimed in claim 2 wherein each said journal bearing includes a generally axially extending groove formed at said zones of load concentration of said bearing bore surfaces and said journals, said groove of each said bearing being disposed in communication with said passage formed in said journal bearing open at said zone of load concentration and communicating with said pump discharge.

4. A pressure loaded pump as claimed in claim 3 wherein said passage formed in each said journal bearing defines a flow limiting orifice minimizing leakage between said pump discharge and said zones of load concentration of said bearing bore surfaces and journals.

5. A pressure loaded pump as claimed in claim 2 wherein said housing includes a pair of passages each one of which communicates with one of said passages in said journal bearing of said assemblies including essentially stationary pumping seals, each said pumping seal includes an outer peripheral surface defining with said housing a passage extending thereabout communicating with one of said passages in said housing, each said stationary pumping seal shifting transversely during pump operation toward said pump inlet to define with said housing a clearance passage communicating between said pump discharge and said passage extending about said stationary pumping seal.

6. A pressure loaded pump as claimed in claim 2 wherein said journal bearing of said assemblies including movable pumping seals includes an outer peripheral surface having a groove extending thereabout communicating with said passage formed therein open at said zone of load concentration of said journal bearing bore and journal, said journal bearing shifting transversely during pump operation toward said pump inlet to define with said housing a clearance passage communicating between said pressure loading chamber and said groove.

7. A pressure loaded pump as claimed in claim 6 wherein said housing includes a pair of passages each one of which communicates with one of said passages in said journal bearing of said assemblies including essentially stationary pumping seals, each said pumping seal includes an outer peripheral surface defining with said housing a passage extending thereabout communicating with one of said passages in said housing, each said stationary pumping seal shifting transversely during pump operation toward said pump inlet to define with said housing a clearance passage communicating between said pump discharge and said passage extending about said stationary pumping seal.

References Cited
UNITED STATES PATENTS

| | | |
|---|---|---|
| 1,271,968 | 7/1918 | Wood. |
| 1,372,576 | 3/1921 | Tullmann. |
| 1,379,587 | 5/1921 | Fisher. |
| 2,527,941 | 10/1950 | Lauck et al. |
| 2,746,394 | 5/1956 | Dolza et al. |
| 2,808,007 | 10/1957 | Gaubatz. |
| 2,823,617 | 2/1958 | Compton. |
| 2,891,483 | 6/1959 | Murray et al. |
| 3,306,225 | 2/1967 | Smith. |

WILLIAM L. FREEH, Primary Examiner

W. J. GOODLIN, Assistant Examiner

U.S. Cl. X.R.
418—135, 102, 206